3,737,438
N-[2-FORMYLPROPYLTHIO(2)]-IMIDES
Ernst Roos, Cologne, Manfred Abele, Porz-Wahn, Roland Nast, Dormagen, and Theo Kempermann and Rudiger Schubart, Cologne, Germany, assignors to Bayer Aktiengesellschaft, Leverkusen, Germany
No Drawing. Filed Feb. 1, 1971, Ser. No. 111,612
Claims priority, application Germany, Feb. 7, 1970, P 20 05 692.2
Int. Cl. C07d 27/10, 27/18, 27/52
U.S. Cl. 260—326 S                 3 Claims

ABSTRACT OF THE DISCLOSURE

This invention relates to new sulphenamides of 2-formyl propyl-2-sulphenic acid and to their use in the production and processing of mixtures based on a natural or synthetic rubber. The novel compounds are prepared by reacting 2-formyl propyl-2-sulphenic chloride with amines and amides in the presence of an acid binding agent. The retarders can be mixed into the rubber in the usual way.

---

This invention relates to new sulphenamides of 2-formyl propyl-2-sulphenic acid corresponding to the general formula

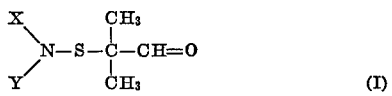
(I)

and to their use in the production and processing of mixtures based on a natural or synthetic rubber.

In Formula I, X and Y represent independently of one another an alkyl radical, cycloalkyl radical, aralkyl radical or an aryl radical optionally substituted by one or more alkyl groups, a radical of the formula:

$$R_1—CO— \quad (II)$$

in which $R_1$ represents hydrogen, alkyl, aralkyl or an aryl radical substituted by one or more alkyl groups, a radical corresponding to the formula:

$$R_2—SO_2— \quad (III)$$

in which $R_2$ represents an alkyl, cycloalkyl, aralkyl radical, an aryl radical optionally substituted by one or more alkyl groups, or a dialkylamino group, or a radical corresponding to the formula

(IV)

in addition to which the radicals X and Y, together with the nitrogen atom can also form a 3- to 7-membered heterocyclic ring system which, in addition to the nitrogen atom, can contain other hetero atoms such as sulphur, oxygen or nitrogen.

The following are examples of the alkyl-, cycloalkyl-, aralkyl- and aryl radicals mentioned in respect of X and Y and in respect of $R_1$ and $R_2$:

Linear or branched alkyl groups with 1 to 4 carbon atoms such as methyl, ethyl, n-propyl, isopropyl, n-butyl, sec.-butyl, tert.-butyl or isobutyl; cycloalkyl radicals containing 5 or 6 ring members such as cyclopentyl, cyclohexyl or methyl cyclohexyl; aralkyl radicals containing up to 4 carbon atoms in the alkyl chain such as benzyl, phenylethyl, phenyl-n-propyl, phenyl isopropyl and phenyl-n-butyl; and aromatic radicals of the benzene series such as phenyl, α-naphthyl or a phenyl radical substituted by a $C_1$–$C_4$-alkyl group, for example methyl phenyl, ethylphenyl, n-propyl phenyl, isopropyl phenyl, n-butylphenyl, isobutyl phenyl or tert-butyl phenyl.

The following are mentioned as examples of radicals of Formula II: formyl, acetyl, n-propionyl, isopropionyl, n-butyryl, isobutyryl, benzoyl and tolyl. Examples of sulphonyl radicals of Formula III include methyl sulphonyl, ethyl sulphonyl, phenyl sulphonyl, o-tolyl sulphonyl, p-tolyl sulphonyl and the N,N'-dimethyl aminosulphonyl, N,N'-diethylaminosulphonyl and N,N'-dicyclohexylaminosulphonyl groups.

The following are mentioned as examples of radicals in which X and Y form a heterocyclic ring with the nitrogen: the N-(phthalimidyl) radical, the N-(tetrahydrophthalimidyl) radical, the N-(succinimidyl) radical, the N-(maleimidyl) radical, the N-(pyrrolidon-2-yl) radical, the N-(morpholinyl) radical, the N-(3-hydantoinyl) radical, the N-(hexahydro-2-H-azepinon-2-yl) radical and the N-(5,5-dimethylhydantoinyl-3) radical.

Products that are preferred within the context of the new compounds of Formula I correspond to the general formulae:

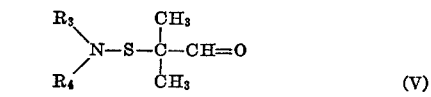
(V)

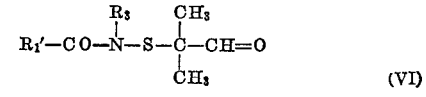
(VI)

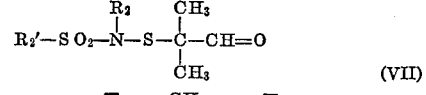
(VII)

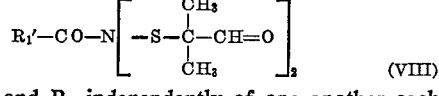
(VIII)

in which $R_3$ and $R_4$ independently of one another each represent a $C_1$ to $C_4$-alkyl radical optionally substituted by a phenyl radical, a cyclopentyl or cyclohexyl radical optionally substituted by a $C_1$ to $C_4$-alkyl radical, or an aromatic radical of the benzene series optionally substituted by a $C_1$ to $C_4$-alkyl radical, $R_1'$ has the meaning already defined in respect of $R_3$ and $R_4$ and may also represent hydrogen, and $R_2'$ also has the meaning already defined in respect of $R_3$ and $R_4$ but may also represent a dimethylamino or diethylamino radical.

Products corresponding to the following formulae are mentioned in particular as examples of compounds of Formula I with a heterocyclic ring system consisting of the radicals X and Y and the nitrogen atom:

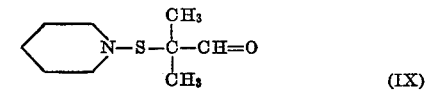
(IX)

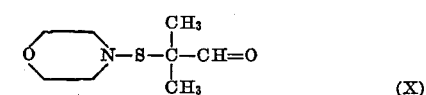
(X)

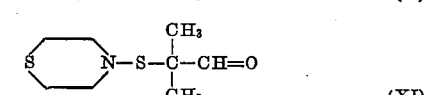
(XI)

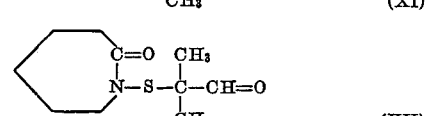
(XII)

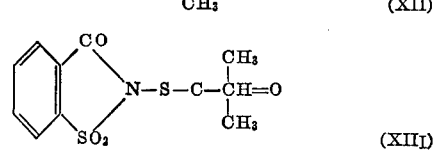
(XIII)

One group of particularly valuable compounds within the context of the new products corresponding to the general Formula I correspond to the formula:

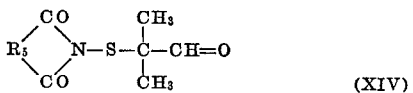

in which $R_5$ represents hydrocarbon radicals of the formula:

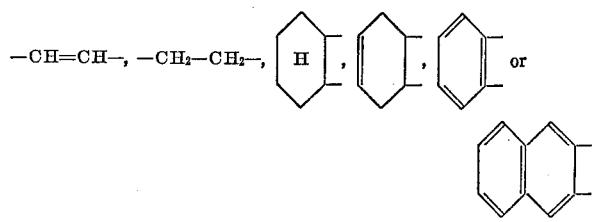

More particularly, the following compounds are mentioned as examples of the compounds of the Formula I according to the invention:

N-methyl-N-(2-formylpropylthio-2)-benzene sulphonamide
N-methyl-N-(2-formylpropylthio-2)-methylsulphonamide
N-methyl-N-(2-formylpropylthio-2)-benzylsulphonamide
N-methyl-N- (2-formylpropylthio-2)-ethylsulphonamide
N-methyl-N-(2-formylpropylthio-2)-phenylethylsulphonamide
N-methyl-N-(2-formylpropylthio-2)-cyclopentylsulphonamide
N-methyl-N-(2-formylpropylthio-2)-cyclohexylsulphonamide
N-methyl-N-(2-formylpropylthio-2)-o-toluenesulphonamide
N-methyl-N-(2-formylpropylthio-2)-p-toluenesulphonamide
N-phenyl-N-(2-formylpropylthio-2)-methylsulphonamide
N-benzyl-N-(2-formylpropylthio-2)-methylsulphonamide
N-ethyl-N-(2-formylpropylthio-2)-methylsulphonamide
N-n-propyl-N-(2-formylpropylthio-2)-methylsulphonamide
N-isopropyl-N-(2-formylpropylthio-2)-methylsulphonamide
N-o-tolyl-N-(2-formylpropylthio-2)-methylsulphonamide
N-p-tolyl-N-(2-formylpropylthio-2)-methylsulphonamide
N-cyclohexyl-N-(2-formylpropylthio-2)-methylsulphonamide
N-cyclopentyl-N-(2-formylpropylthio-2)-methylsulphonamide
N-phenyl-N-(2-formylpropylthio-2)-benzenesulphonamide
N-phenyl-N-(2-formylpropylthio-2)-o-toluenesulphonamide
N-phenyl-N-(2-formylpropylthio-2)-p-toluenesulphonamide
N-o-tolyl-N-(2-formylpropylthio-2)-benzenesulphonamide
N-p-tolyl-N-(2-formylpropylthio-2)-benzenesulphonamide
N-phenyl-N-(2-formylpropylthio-2)-cyclohexylsulphonamide
N-phenyl-N-(2-formylpropylthio-2)-cyclopentylsulphonamide
N-benzyl-N-(2-formylpropylthio-2)-benzenesulphonamide
N-methyl-N-(2-formylpropylthio-2)N',N'-dimethylsulphamide
N-ethyl-N-(2-formylpropylthio-2)-N',N'-dimethylsulphamide
N-phenyl-N-(2-formylpropylthio-2)-N',N'-dimethylsulphamide
N-o-tolyl-N-(2-formylpropylthio-2)-N',N'-dimethylsulphamide
N-p-tolyl-N-(2-formylpropylthio-2)-N',N'-dimethylsulphamide
N-benzyl-N-(2-formylpropylthio-2)-N',N'-dimethylsulphamide
N-methyl-N-(2-formylpropylthio-2)-formamide
N-ethyl-N-(2-formylpropylthio-2)-formamide
N-phenyl-N-(2-formylpropylthio-2)-formamide
N-benzyl-N-(2-formylpropylthio-2)-formamide
N-cyclohexyl-N-(2-formylpropylthio-2)-formamide
N-methyl-N-(2-formylpropylthio-2)-acetamide
N-ethyl-N-(2-formylpropylthio-2)-acetamide
N-(2-formylpropylthio-2)-acetanilide
N-benzyl-N-(2-formylpropylthio-2)-acetamide
N-cyclohexyl-N-(2-formylpropylthio-2)-acetamide
N-methyl-N-(2-formylpropylthio-2)-benzamide
N-ethyl-N-(2-formylpropylthio-2)-benzamide
N-phenyl-N-(2-formylpropylthio-2)-benzamide
N-cyclohexyl-N-(2-formylpropylthio-2)-benzamide
N,N'-dimethyl-N-(2-formylpropylthio-2)-amine
N,N'-diethyl-N-(2-formylpropylthio-2)-amine
N,N'-diphenyl-N-(2-formylpropylthio-2)-amine
N-methyl-N-phenyl-N-(2-formylpropylthio-2)-amine
N-methyl-N-ethyl-N-(2-formylpropylthio-2)-amine
N,N'-dicyclohexyl-N-(2-formylpropylthio-2)-amine
N-methyl-N,N-bis-(2-formylpropylthio-2)-amine
N-ethyl-N,N-bis-(2-formylpropylthio-2)-amine
N-phenyl-N,N-bis-(2-formylpropylthio-2)-amine
N-o-tolyl-N,N'-bis-(2-formylpropylthio-2)-amine
N-p-tolyl-N,N'-bis-(2-formylpropylthio-2)-amine
N-cyclohexyl-N,N'-bis-(2-formylpropylthio-2)-amine
N-[2-formylpropylthio-(2)]-maleimide
N-[2-formylpropylthio-(2)]-phthalimide
N-[2-formylpropylthio-(2)]-caprolactam
N-[2-formylpropylthio-(2)]-pyrrolidone-2
N-[2-formylpropylthio-(2)]-succinimide
N-[2-formylpropylthio-(2)]-morpholine
N-[2-formylpropylthio-(2)]-tetrahydrophthalimide
N-[2-formylpropylthio-(2)]-hexahydrophthalimide
N-[2-formylpropylthio-(2)]-hydantoin
5,5-dimethyl-N-[2-formylpropylthio-(2)]-3-hydantoin.

The novel compounds of Formula I are prepared by reacting 2-formylpropyl-2-sulphene chloride in the presence of an acid-binding agent with compounds of the general formula:

in which: X and Y independently of one another represent an alkyl radical, a cycloalkyl radical, an aralkyl radical or an aryl radical optionally substituted by one or more alkyl groups, a radical corresponding to the formula:

$$R_1\text{—CO—} \qquad (II)$$

in which $R_1$ represents hydrogen, alkyl, aralkyl or an aryl radical substituted by one or more alkyl groups, a radical corresponding to the formula $$R_2\text{—SO}_2\text{—} \qquad (III)$$

in which $R_2$ represents an alkyl radical, cycloalkyl radical aralkyl radical, an aryl radical optionally substituted by one or more alkyl groups or a dialkylamino group, or a radical of the formula

in which the radicals X and Y may form together with the nitrogen atom a 3- to 7-membered heterocyclic ring system which, in addition to the nitrogen atom, may contain other hetero atoms such as sulphur, oxygen or nitrogen.

This reaction is illustrated by the following reaction equation:

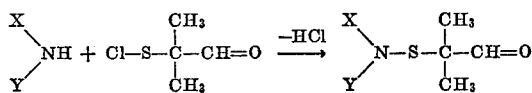

The reaction is carried out at a temperature in the range of from about −50° C. to about +50° C. and preferably at a temperature in the range of from about −10° C. to about +10° C.

The quantities in which the reaction components are used are variable within wide limits. An excess of the compound of Formula XV can be of advantage, especially where this compound is a liquid, because in this case it can simultaneously act as a solvent. In general, however, the reaction components are used in equimolecular quantities. It can also be of advantage to use an inert organic solvent or diluent as the reaction medium. Examples of suitable solvents or diluents include hydrocarbons such as light petrol, cleaning spirit, hexane, cyclohexane, benzene, toluene, xylene; chlorinated hydrocarbons such as methylene chloride, ethylene chloride, chloroform, carbon tetrachloride, chlorobenzene; ethers such as diethyl ether, diisopropyl ether, dioxane, tetrahydrofuran; and ketones such as acetone, methylethyl ketone, diethyl ketone, methylpropyl ketone, methylbutyl ketone and cyclohexanone.

Inorganic or organic bases are suitable for use as the acid-binding agents. In general, tertiary amines such as triethylamine and N,N-dimethyl cyclohexylamine or pyridine bases such as pyridine itself, alkylpyridines and quinoline, are used as the acid-binding agents. It is also possible, however, to use inorganic bases such as magnesium oxide, calcium oxide, sodium carbonate, potassium carbonate and calcium carbonate as the acid-binding agents, in which case it can be of advantage to use these compounds in finely divided form. The acid-binding agent can also be used as a solvent or diluent where it is in the form of a liquid, for example, triethylamine or pyridine. The reaction components can be combined in any desired order. In general, the component of Formula XV and the acid-binding agent, optionally in a solvent or a diluent, are initially introduced and the 2-formylpropyl-2-sulphene chloride added optionally in solution in a solvent. The reaction product is worked up in the usual way, for example by removing the amine hydrochloride or the inorganic chloride formed (in cases where an inorganic base has been used as the acid-binding agent), by filtration or by washing out with water followed by isolation of the 2-formylpropyl sulphenamide (I). Some of the new compounds are in the form of crystalline solids whilst others are in the form of liquid substances.

The following compounds for example may be used as reaction components of Formula XV for the reaction: N-methylbenzene sulphonamide, N-methylmethyl sulphonamide, N - methylbenzyl sulphonamide, N - methylethyl sulphonamide, N-methylphenylethyl sulphonamide, N - methyl cyclopentyl sulphonamide, N - methyl cyclohexyl sulphonamide, N - methyl - o - toluene sulphonamide, N - methyl - p - toluene sulphonamide, N-phenylmethyl sulphonamide, N - benzylmethyl sulphonamide, N-ethylmethyl sulphonamide, N-n-propylmethyl sulphonamide, N-isopropylmethyl sulphonamide, N-o-tolylmethyl sulphonamide, N-p-tolylmethyl sulphonamide, N-cyclohexylmethyl sulphonamide, N-cyclopentylmethyl sulphonamide, N - phenylbenzene sulphonamide, N - phenyl-o-toluene sulphonamide, N - phenyl - p - toluene sulphonamide, N - o - tolylbenzene sulphonamide, N-p-tolylbenzene sulphonamide, N-phenyl cyclohexyl sulphonamide, N-phenyl cyclopentyl sulphonamide, N-benzylbenzene sulphonamide, N - methyl - N',N' - dimethylsulphamide, N - ethyl - N',N' - dimethylsulphamide, N-phenyl-N',N'-dimethylsulphamide, N - o - tolyl - N',N' - dimethylsulphamide, N - p - tolyl - N',N' - dimethyl sulphamide, N-benzyl - N',N' - dimethyl sulphamide, N-methyl formamide, N-ethyl formamide, N-phenyl formamide, N-benzyl formamide, N-cyclohexyl formamide, N-methyl acetamide, N-ethyl acetamide, N-acetanilide, N-benzyl acetamide, N-cyclohexyl acetamide, N-methyl benzamide, N-ethyl benzamide, N-phenyl benzamide, N-cyclohexyl benzamide, dimethyl amine, diethyl amine, diphenyl amine, N-methyl aniline, methylethyl amine, dicyclohexyl amine, methylamine, ethylamine, aniline, o-toluidine, p-toluidine and cyclohexylamine.

The 2-formylpropyl - 2 - sulphene chloride can be prepared by known methods, for example by chlorolysis with chlorine or sulphuryl chloride, from the corresponding disulphide (cf. United States patent specification No. 2,580,695). This process is illustrated by the following reaction equation:

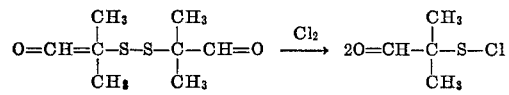

Instead of the pure 2-formylpropyl sulphene chloride, it is also possible with advantage to employ solutions of this compound in an inert solvent for the preparation of the sulphenamides of Formula I according to the invention.

The present invention also relates to the use of the new sulphenamides of Formula I derived from 2-formylpropyl-2-sulphenic acid in rubber mixtures which are vulcanised. The compounds show for example outstanding properties as vulcanisation retarders.

In the production and processing of rubber mixtures containing vulcanising agents, for example sulphur and accelerators, undesirable, premature vulcanisation, known as pre-vulcanisation, can take place to a certain extent before vulcanisation proper (cf. Bayer-Mitteilungen für die Gummi Industrie, No. 42 of 1.5.1968, pages 3 to 7 especially page 3, left-hand column). Pre-vulcanisation can take place for example either in the mixer or even during any of the following processing stages such as for example extrusion or calendering.

It is already known that the danger of premature vulcanisation can be reduced by the addition of N-nitrosoamines such as for example N-nitrosodiphenylamine, to rubber mixtures (cf. Technical Information R22 "Rubber Chemicals") issued by Imperial Chemical Industries, Manchester, England, pages 1 to 11, especially page 1; Rubber Chemistry and Technology, vol. 30 (1957), pages 1291–1346, especially page 1302, lines 3 and 4, Rubber Journal, March 1967, page 11, right-hand column, second paragraph, especially line 18 of the right-hand column.

Unfortunately, the use of these retarders leads under certain conditions to the elimination of the nitroso group resulting in the formation of porous vulcanisates (cf. Technical Information R22 "Rubber Chemicals" issued by Imperial Chemical Industries, Manchester, England, pages 1 to 11, especially page 2, second paragraph). In addition, it is not only pre-vulcanisation which is influenced by these compounds, but also, and very distinctly, vulcanisation proper: in other words, the vulcanisation time is increased (cf. Bayer Mitteilungen für die Gummi-Industrie, No. 42 of 1.5.1968, pages 3 to 7, especially page 3, right-hand column, lines 39 to 45, and page 3, right-hand column, last paragraph, especially lines 47, 48, 55 and 56).

In addition, the N-nitrosoamines have to be added in relatively large quantities in order to obtain a certain retarding effect.

It has now been found that compounds corresponding to the general formula

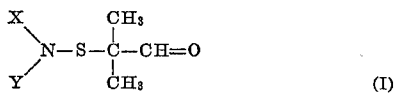  (I)

in which X and Y independently of one another represent an alkyl radical, a cycloalkyl radical, an aralkyl radical or an aryl radical optionlly substituted by one or more alkyl groups, or a radical corresponding to the formula—

$$R_1—CO—$$  (II)

in which $R_1$ represents hydrogen, an alkyl radical, an aralkyl radical or an aryl radical substituted by one or more alkyl groups, or a radical corresponding to the formula $$R_2—SO_2—$$  (III)

in which $R_2$ represents an alkyl radical, cycloalkyl radical, aralkyl radical, an aryl radical optionally substituted by one or more alkyl groups or a dialkylamino group, or a radical corresponding to the formula

  (IV)

in addition to which the radicals X and Y together with the nitrogen atom can form a 3- to 7-membered heterocyclic ring system which in addition to the nitrogen atom can contain further hetero atoms such as sulphur, oxygen or nitrogen, can be used in the production and processing of mixtures containing natural or synthetic rubber by known methods.

Surprisingly, the sulphenamides of Formula I according to the invention are particularly suitable for use as vulcanisation retarders. They show a much better effect than the conventional nitrosoamines. In addition, the compounds of Formula I do not give any porous vulcanisates and have a less noticeable influence then N-nitrosoamines upon the velocity of vulcanisation proper.

Suitable rubbers for the production and processing of mixtures based on natural or synthetic rubber include, for example, natural rubber or synthetic rubber-like polymers obtained for example from conjugated diolefins such as butadiene, dimethyl-butadiene, chloroprene, isoprene and its homologues, or copolymers of conjugated diolefins such as those with polymerisable vinyl compounds e.g. styrene, α-methyl styrene, acrylonitrile, methacrylonitrile, acrylates and methacrylates.

The retarders used in accordance with the invention can be mixed into the rubber in the usual way, for example on mixing rollers or in an internal mixer, being preferably added before or at the same time as the other constituents are added. However, they can also be added as the final component of the mixture.

The retarders according to the invention are preferably used in quantities of from 0.05 to 5.0% by weight and more particularly in quantities of from 0.1 to 1.5% by weight of the rubber.

The rubber mixtures to be treated contain the usual additives required for vulcanisation, such as vulcanising agents and accelerators. The vulcanising agents, for example sulphur, can be used in the usual quantities, and are generally used in a quantity of from 0.2 to 5.0% by weight of the rubber to be vulcanised. Examples of accelerators include thiazoles such as 2-mercapto benzthiazole or dibenzothiazyl disulphide, sulphenamides such as benzothiazyl-2-cyclohexyl sulphenamide, benzthiazyl-2-tert.-butyl sulphenamide or benzthiazyl sulphene morpholide, guanidines such as diphenyl guanidine or di-o-tolyl guanidine, dithiocarbamates such as the zinc salt of di-ethyl dithiocarbamic acid, and thiurams such as tetramethyl thiuram disulphide or tetramethyl thiuram monosulphide. It is also possible to use mixtures of accelerators. The accelerators are generally used in quantities of from 0.05 to 5% by weight of the rubber.

The rubber mixture can also contain other known additives such as for example active or inactive fillers such as chalk or carbon black, anti-oxidants, anti-ozonants, waxes, pigments, zinc oxide, fatty acids such as stearic acid or processing oils.

The rubber can be vulcanised by heating to the usual temperatures, preferably to a temperature of from 120 to 170° C., although it is also possible to work at higher or lower temperatures.

The invention is illustrated by the following examples. Unless otherwise indicated, the parts quoted in the tables are parts by weight, based on 100.0 parts by weight of rubber.

The testing methods are defined as follows (cf. also Kautschuk und Gummi, Kunststoffe 20, No. 3/1967, pages 126–134, especially pages 127 and 133).

Pre-vulcanisation time: Determined on the same lines as the Mooney Scorch Time (cf. DIN 53 524): The period of time determined from the strain/heating time curve which elapses until the strain at 300% elongation has risen by 20 points above the minimum (stage vulcanisation at 110° C.).

M 300: Strain (kp./cm.$^2$) at 300% elongation, determined in accordance with DIN 53 504, sheet 2.

F: Tensile strength (kp./cm.$^2$) as determined in accordance with DIN 53 504, sheet 1, standard ring R I.

D: Breaking elongation (percent) as determined in accordance with DIN 53 504, sheet 1, standard ring R I.

H: Hardness (Shore A) as determined in accordance with DIN 53 505, range A, 4 mm. flaps.

Full vulcanisation time: The period of time which elapses until the strain has reached 90% of its maximum (at 300% elongation) at 140° C.

EXAMPLE 1

N-[2-formylpropylthio-(2)]-phthalimide 44.1 g. (0.3 mol) of phthalimide and 33 g. (0.33 mole) of triethylamine were dissolved in 100 ml. of dimethyl formamide, followed by the addition at 10 to 20° C. of 300 ml. of 1-molar solution of 2-formylpropyl-2-sulphene chloride in carbon tetrachloride. The resulting suspension was stirred for 1 hour at 20 to 25° C., water was added and the product was filtered off under suction. The N-[2-formylpropylthio-(2)]-phthalimide obtained in the form of a colourless, crystalline residue was washed with methanol and dried. Yield: 60 g.=80.5% of the theoretical, M.P. 129–131° C.

*Analysis.*—Calcd. for $C_{12}H_{11}NO_3S$ (249) (percent): C, 57.8; H, 4.4; N, 5.6; O, 19.3; S, 12.9. Found (percent): C, 57.7; H, 4.7; N, 5.5; O, 18.9; S, 12.8.

EXAMPLE 2

N-[2-formylpropylthio-(2)]-tetrahydrophthalimide

A solution of 13.85 g. (0.1 mol) of 2-formylpropyl-2-sulphene chloride in 100 ml. of carbon tetrachloride was added at 0 to 10° C. to 15.1 g. (0.1 mol) of tetrahydrophthalimide and 11 g. (0.11 mol) of triethylamine in 200 ml. of carbon tetrachloride. The mixture was stirred for 2 hours at 25° C. and diluted with 300 ml. of methylene chloride, and 500 ml. of water were then added. The aqueous phase was separated off and discarded, and the solvent phase was concentrated by evaporation in a vacuum of up to 12 mm./50° C. N-[2-formylpropylthio-(2)]-tetrahydrophthalimide is obtained in the form of a crystalline residue, being recrystallised from isopropanol. Yield: 13.5 g.=53% of the theoretical; M.P. 124–127° C.

*Analysis.*— Calcd. for $C_{12}H_{15}NO_3S$ (235) (percent): C, 56.9; H, 5.9; N, 5.5; O, 19.0; S, 12.7. Found (percent): C, 57.1; H, 6.2; N, 5.3; O, 19.0; S, 12.4.

EXAMPLE 3

N-phenyl-N-[2-formylpropylthio-(2)]-benzene sulphonamide

A solution of 13.85 g. (0.1 mol) of 2-formylpropyl-2-sulphene chloride in 75 ml. of carbon tetrachloride was added at 0 to 10° C. to 23.3 g. (0.1 mol) of N-phenyl-benzene sulphonamide and 11 g. (0.11 mol) of triethylamine in 200 ml. of carbon tetrachloride. The mixture was stirred for 2 hours at 20 to 25° C., followed by the addition of 250 ml. of water. The $CCl_4$-solution was separated off, dried over $Na_2SO_4$ and concentrated by evaporation in a vacuum of up to 12 mm. at 40° C. The residue was dissolved in benzene, and light petrol was added to the resulting solution, resulting in the precipitation of N-phenyl-N[2-formylpropylthio-(2)]-benzene sulphonamide in the form of colourless crystals. Yield: 23.4 g.=70% of the theoretical; M.P. 102–105° C.

Analysis.—Calcd. for $C_{16}H_{17}NO_3S_2$ (335) (percent): C, 57.3; H, 5.1; N, 4.2; O, 14.3; S, 19.1. Found (percent): C, 57.0; H, 5.3; N, 4.2; O, 14.5; S, 18.7.

EXAMPLE 4

N-methyl-N-[2-formylpropylthio-(2)]-benzene sulphonamide

A solution of 13.85 g. (0.1 mol) of 2-formylpropyl sulphene chloride in 75 ml. of $CCl_4$ was added at 0 to 10° C. to 17.1 g. (0.1 mol) of N-methyl benzene sulphonamide and 11.1 g. (0.1 mol) of triethylamine in 200 ml. of $CCl_4$. The mixture was stirred for 2 hours at 25° C., followed by the addition of 250 ml. of $H_2O$. The $CCl_4$ solution was distilled at 40° C./12 mm. leaving behind N-methyl-N-[2-formylpropylthio - (2)]-benzene sulphonamide in the form of a reddish-brown oil. Yield: 30 g. or 87% of the theoretical.

Analysis.—Calcd. for $C_{11}H_{15}NO_3S_2$ (273) (percent): C, 48.3; H, 5.5; N, 5.1; O, 17.5; S, 23.4. Found (percent): C, 48.2; H, 5.3; N, 4.8; O, 17.0; S, 22.9.

EXAMPLE 5

N-phenyl-N-[2-formylpropylthio-(2)]-formamide

A solution of 13.85 g. (0.1 mol) of 2-formylpropyl-2-sulphene chloride in 100 ml. of $CCl_4$ was added at 0 to 10° C. to 12.1 g. (0.1 mol) of N-phenyl formamide and 11 g. (0.1 mol) of triethylamine in 200 ml. of $CCl_4$. The mixture was stirred for 2 hours at 20 to 25° C., followed by the addition of 300 ml. of $H_2O$. The $CCl_4$-solution was distilled at 50° C./12 mm., leaving behind N-phenyl-N-[2-formylpropylthio-(2)]-formamide in the form of a brown oil. Yield: 21 g.=94% of the theoretical.

Analysis.—Calcd. for $C_{11}H_{13}NO_2S$ (223) (percent): C, 59.2; H, 5.8; N, 6.3; O, 14.4; S, 14.4. Found (percent): C, 58.6; H, 6.0; N, 6.7; O, 13.9; S, 14.4.

EXAMPLE 6

N-methyl-N-[2-formylpropylthio-(2)]-benzyl sulphonamide

A solution of 13.85 g. (0.1 mol) of 2-formylpropyl-2-sulphene chloride in 100 ml. of $CCl_4$ was added at 0 to 10° C. to 18.5 g. (0.1 mol) of N-methylbenzyl sulphonamide and 11 g. (0.1 mol) of triethylamine. The mixture was stirred for 3 hours at 25° C., followed by the addition of 300 ml. of water. The $CCl_4$ phase was separated off and distilled at 40° C./12 mm., leaving behind N-methyl-N-[2-formylpropylthio-(2)]-benzyl sulphonamide in the form of a brown oil. Yield: 26 g. or 90% of the theoretical.

Analysis.—Calcd. for $C_{12}H_{17}NO_3S_2$ (287) (percent): C, 50.2; H, 5.9; N, 4.9; O, 16.7; S, 22.3. Found (percent): C, 49.5; H, 5.7; N, 4.7; O, 15.6; S, 22.0.

The sulphenamides (B) listed in the following table were similarly obtained from the starting components (A):

TABLE I

| A | B | | C Calculated | | Found | |
|---|---|---|---|---|---|---|
| | | | N | S | N | S |
| phenyl-N(H)-CO-CH₃ | phenyl-N(CO-CH₃)(S-C(CH₃)₂-CH=O) | Oil | 5.9 | 13.5 | 5.7 | 13.1 |
| caprolactam NH | caprolactam N-S-C(CH₃)₂-CH=O | Oil | 6.5 | 14.9 | 6.0 | 15.8 |
| CH₃-SO₂-NH-CH₃ | CH₃-SO₂-N(CH₃)(S-C(CH₃)₂-CH=O) | Oil | 6.6 | 30.3 | 5.9 | 29.6 |
| (CH₃)₂N-SO₂-NH-CH₃ | (CH₃)₂N-SO₂-N(CH₃)(S-C(CH₃)₂-CH=O) | Oil | 11.7 | 26.6 | 11.6 | 26.3 |
| phenyl-N(CH₃)(H) | phenyl-N(CH₃)(S-C(CH₃)₂-CH=O) | Oil | 6.7 | 15.3 | 6.9 | 15.4 |
| phthalimide NH | phthalimide N-S-C(CH₃)₂-CH=O | M.P., 79° C. | 56.5 | 12.5 | 57.1 | 11.9 |

TABLE I—Continued

| A | B | C M.P., °C. | Calculated N | Calculated S | Found N | Found S |
|---|---|---|---|---|---|---|
| CH₂—CO<br>\\<br>\\NH<br>/<br>CH₂—CO | CH₂—CO     CH₃<br>\\             \|<br>  N—S—C—CH=O<br>/            \|<br>CH₂—CO     CH₃ | M.P., 105° C. | 7.0 | 15.9 | 6.3 | 15.5 |

The following mixtures were prepared on mixing rolls:

EXAMPLE 7

| Mixture number | 1 | 2 | 3 | 4 | 5 | 6 | 7 | 8 |
|---|---|---|---|---|---|---|---|---|
| Natural rubber, smoked sheets | 100.0 | 100.0 | 100.0 | 100.0 | 100.0 | 100.0 | 100.0 | 100.0 |
| Zinc oxide | 5.0 | 5.0 | 5.0 | 5.0 | 5.0 | 5.0 | 5.0 | 5.0 |
| Stearic acid | 3.0 | 3.0 | 3.0 | 3.0 | 3.0 | 3.0 | 3.0 | 3.0 |
| Aromatic mineral oil plasticiser | 2.5 | 2.5 | 2.5 | 2.5 | 2.5 | 2.5 | 2.5 | 2.5 |
| High-abrasion furnace black | 45.0 | 45.0 | 45.0 | 45.0 | 45.0 | 45.0 | 45.0 | 45.0 |
| Naphthenic mineral oil plasticiser | 2.5 | 2.5 | 2.5 | 2.5 | 2.5 | 2.5 | 2.5 | 2.5 |
| Sulphur | 2.3 | 2.3 | 2.5 | 2.3 | 2.3 | 2.3 | 2.3 | 2.3 |
| N-cyclohexyl-2-benzthiazyl sulphenamide | 0.5 | 0.5 | 0.5 | 0.5 | 0.5 | 0.5 | 0.5 | 0.5 |
| N-nitrosodiphenylamine (for comparison) | | 0.6 | | | | | | |
| N-[2-formylpropylthio-(2)]-phthalimide | | | 0.1 | | | | | |
| N-[2-formylpropylthio-(2)]-tetrahydrophthalimide | | | | 0.1 | | | | |
| N-phenyl-N-[2-formylpropylthio-(2)]-benzene sulphonamide | | | | | 0.15 | | | |
| N-methyl-N-[2-formylpropylthio-(2)]-benzene sulphonamide | | | | | | 0.3 | | |
| N-phenyl-N-[2-formylpropylthio-(2)]-formamide | | | | | | | 0.2 | |
| N-methyl-N-[2-formypropylthio-(2)]-benzylsulphonamide | | | | | | | | 0.25 |

Note.—The mixtures obtained were press-vulcanised into 4 mm. thick test specimens, heating being carried out in stages at 110° C. and at 140° C. The results are set out in Table II.

TABLE II

| Mixture No. | Vulcanisation retarder | Pre-vulcan-isation time 110° C. (mins.) | Full-vulcan-isation time 140° C. (mins.) | Mechanical properties corresponding to the full-vulcanisation time | | | |
|---|---|---|---|---|---|---|---|
| | | | | F (kp/cm.²) | D (percent) | M300 (kp/cm.²) | Hardness Shore A |
| 1 | None | 79.0 | 24.0 | 222 | 535 | 104 | 61 |
| 2 | N-nitrosodiphenylamine (for comparison) | 105.0 | 32.0 | 208 | 540 | 89 | 60 |
| 3 | N-[2-formylpropylthio(2)]-phthalimide | 104.0 | 28.5 | 226 | 540 | 102 | 62 |
| 4 | N-[2-formylpropylthio(2)]-tetrahydrophthalimide | 106.0 | 29.0 | 225 | 530 | 105 | 62 |
| 5 | N-phenyl-N-[2-formylpropylthio(2)]-benzene sulphonamide | 107.0 | 29.2 | 226 | 542 | 101 | 63 |
| 6 | N-methyl-N-[2-formylpropylthio-(2)]-benzene sulphonamide | 107.0 | 28.5 | 233 | 540 | 107 | 63 |
| 7 | N-phenyl-N-[2-formylpropylthio-(2)]-formamide | 103.5 | 28.7 | 224 | 550 | 103 | 62 |
| 8 | N-methyl-N-[2-formylpropylthio-(2)]-benezene sulphonamide | 104.0 | 29.0 | 218 | 538 | 106 | 62 |

As can be seen from Table II, the novel retarders, used in quantities of at most 0.3% by weight, based on 100.0 parts by weight of rubber, are equivalent in their retarding effect to N-nitrosodiphenylamine used in a quantity of 0.6% by weight. It follows from this that the novel retarders are at least twice as effective as N-nitrosodiphenylamine and, in some cases, are much more effective, for example up to six times more effective (cf. Table II).

The full vulcanisation time is influenced to a far lesser extent by the compounds prepared in accordance with the invention than by N-nitrosodiphenylamine. In other words, the compounds used in accordance with the invention have an extremely favourable effect upon the vulcanisation characteristics.

The vulcanisates obtained with the substances according to the invention are not porous when processed (i.e. extruded) at temperatures of 130° C. for example.

What we claim is:

1. A compound of the formula

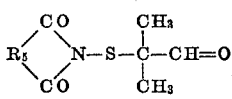

wherein R₅ is

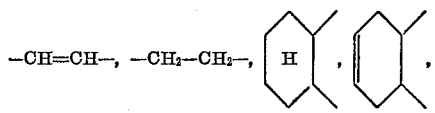

2. 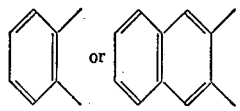

3. 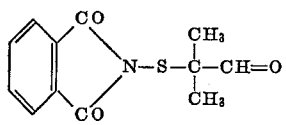

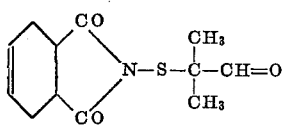

References Cited

UNITED STATES PATENTS 3,499,030   3/1970   Kuhle et al.    260—551
3,586,696   6/1971   Kerwood et al.    260—326

ALEX MAZEL, Primary Examiner

J. A. NARCAVAGE, Assistant Examiner

U.S. Cl. X.R.

260—79.5 R, 239.3 R, 243 B, 247.1, 293.85, 301, 309.5, 326.5 S, 453 R, 551 S, 556 A, 556 NSN